United States Patent
Song

(10) Patent No.: US 11,843,863 B2
(45) Date of Patent: Dec. 12, 2023

(54) APPARATUS AND METHOD FOR GENERATING PANORAMA IMAGE

(71) Applicant: SK hynix Inc., Gyeonggi-do (KR)

(72) Inventor: Jeong Yong Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 100 days.

(21) Appl. No.: 17/446,066

(22) Filed: Aug. 26, 2021

(65) Prior Publication Data

US 2022/0294984 A1 Sep. 15, 2022

(30) Foreign Application Priority Data

Mar. 15, 2021 (KR) .................. 10-2021-0033379

(51) Int. Cl.
*H04N 23/698* (2023.01)
*G06T 5/00* (2006.01)
*H04N 23/951* (2023.01)
*G06T 3/40* (2006.01)

(52) U.S. Cl.
CPC ........... *H04N 23/698* (2023.01); *G06T 5/009* (2013.01); *H04N 23/951* (2023.01); *G06T 3/4038* (2013.01); *G06T 2207/20104* (2013.01); *G06T 2207/20208* (2013.01)

(58) Field of Classification Search
CPC ............ H04N 5/23238; H04N 5/23232; G06T 2207/20104; G06T 5/009; G06T 2207/20208; G06T 3/4038
USPC ......................................................... 348/36
See application file for complete search history.

(56) References Cited

U.S. PATENT DOCUMENTS

| | | | |
|---|---|---|---|
| 8,933,985 B1* | 1/2015 | Rapaport | H04N 5/77 348/36 |
| 10,681,313 B1* | 6/2020 | Day | H04N 23/6842 |
| 11,538,173 B1* | 12/2022 | Piety | G06T 7/262 |
| 2006/0177150 A1* | 8/2006 | Uyttendaele | G06T 3/4038 382/284 |
| 2013/0222533 A1* | 8/2013 | Maeda | H04N 23/698 348/36 |
| 2013/0229546 A1* | 9/2013 | Furumura | G06T 5/50 348/229.1 |
| 2015/0162048 A1* | 6/2015 | Hirata | H04N 23/90 386/341 |
| 2015/0269714 A1* | 9/2015 | Boitard | H04N 23/76 382/274 |

(Continued)

FOREIGN PATENT DOCUMENTS

KR 101279576 B1 6/2013
KR 101616874 B1 5/2016

*Primary Examiner* — Christopher S Kelley
*Assistant Examiner* — Asmamaw G Tarko
(74) *Attorney, Agent, or Firm* — IP & T GROUP LLP

(57) ABSTRACT

There are provided an apparatus and a method for generating a panorama image. The apparatus includes: a Region Of Interest (ROI) selecting block for receiving a plurality of images, and outputting ROI images by selecting an ROI of each of the plurality of images; a High Dynamic Range (HDR) processing block for performing HDR processing on the ROI images; and a panorama image generating block for generating a panorama image by stitching the plurality of images using a matching coordinate of the ROI images on which the HDR processing is performed. The HDR processing block performs the HDR processing on the panorama image.

9 Claims, 7 Drawing Sheets

(56) References Cited

U.S. PATENT DOCUMENTS

2017/0074755 A1* 3/2017 Adiga ................. G01N 1/36
2018/0276800 A1* 9/2018 Abbas ................. G09G 5/005
2018/0367732 A1* 12/2018 Baldwin ............. H04N 23/632
2018/0374192 A1* 12/2018 Kunkel ................ H04N 23/58
2023/0011644 A1* 1/2023 Zhao ................... A61B 6/542

* cited by examiner

APPARATUS AND METHOD FOR GENERATING PANORAMA IMAGE

CROSS-REFERENCE TO RELATED APPLICATION

The present application claims priority under 35 U.S.C. § 119(a) to Korean patent application number 10-2021-0033379 filed on Mar. 15, 2021, the entire disclosure of which is incorporated by reference herein.

BACKGROUND

Field of Invention

The present disclosure generally relates to an apparatus and a method for generating a panorama image, and more particularly, to an apparatus and a method for generating a panorama image by matching a plurality of images to one image.

Description of Related Art

Since the size of an image contained in a photograph is limited in photographing using an ordinary image photographing device, there occurs a case where a wide image should be generated by photographing each of several still images and combining the photographed still images. This photographing technique is referred to as panorama image photographing.

As the size of displays increases and a display environment in which several single displays are connected is provided, panorama contents have recently been widely used. The panorama contents refer to high-definition contents having a wide angle of view, which are used to maximize the provision of sense of realism to a user. The panorama contents are used in several parts of real life, such as an aerial panorama which enables a user to overlook a ground at a glance from the sky, a street panorama which provides real-time-based information on ground spaces of the whole country by applying GPS coordinates to a digital map, and a point panorama which shows, at a high resolution, information of specific places such as tourist attractions, accommodations, and restaurants. Also, the panorama contents are widely used in various industrial fields such as advertisement, education, military, performance, and sightseeing.

SUMMARY

Embodiments of the present disclosure provide an apparatus and a method for generating a panorama image, in which matching is performed by applying High Dynamic Range (HDR) on a matching plane of a plurality of images and then selecting, as matching point, a spot having a high correlation.

In accordance with an aspect of the present disclosure, there is provided an apparatus for generating a panorama image, the apparatus including: a Region Of Interest (ROI) selecting block configured to receive a plurality of images, and output ROI images by selecting an ROI of each of the plurality of images; a High Dynamic Range (HDR) processing block configured to perform HDR processing on the ROI images; and a panorama image generating block configured to generate a panorama image by stitching the plurality of images using a matching coordinate of the ROI images on which the HDR processing is performed, wherein the HDR processing block generates a final panorama image by performing the HDR processing on the panorama image.

In accordance with another aspect of the present disclosure, there is provided a method for generating a panorama image, the method including: setting overlapping regions of a first image and a second image respectively as a first Region Of Interest (ROI) image and a second ROI image; performing High Dynamic Range (HDR) processing on the first ROI image and the second ROI image; dividing the first ROI image on which the HDR processing is performed into a plurality of image regions, and searching for a matching point by matching a main image region among the plurality of image regions to the second ROI image on which the HDR processing is performed; and generating a panorama image by stitching the first image and the second image, based on the matching point.

In accordance with another aspect of the present disclosure, there is provided an operating method of an image processor, the operating method comprising: High Dynamic Range (HDR) processing on respective first and second overlap regions; and generating a panorama image by stitching first and second images with reference to a point where a selected region within the HDR-processed first overlap region is matched with the HDR-processed second overlap region. The first and second overlap regions may be included in the respective first and second images and overlap each other

BRIEF DESCRIPTION OF THE DRAWINGS

Various embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

Hereinafter, various embodiments of the present disclosure will be described in detail with reference to the accompanying drawings in order for those skilled in the art to be able to readily implement the technical spirit of the present disclosure.

Figure 1:
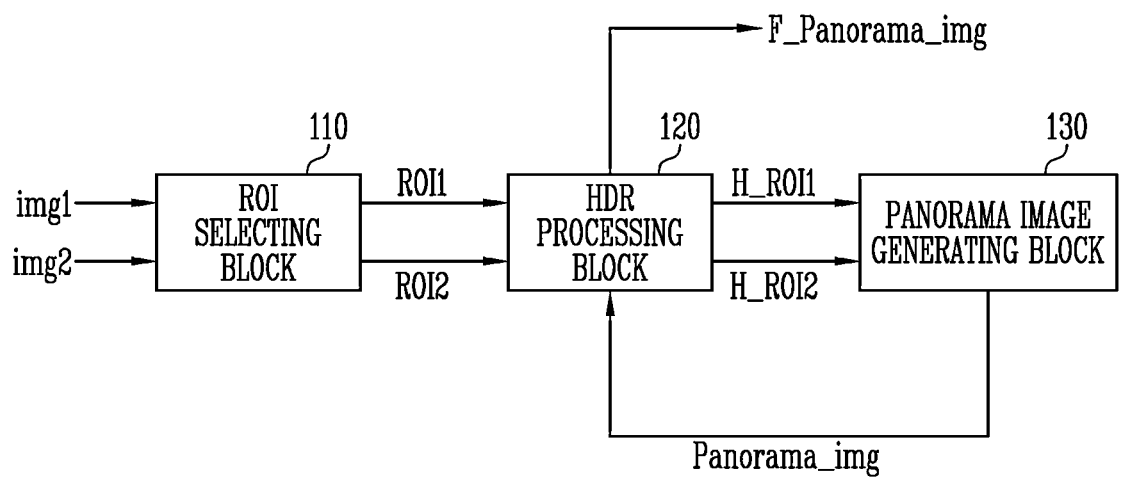
FIG. 1 is a block diagram illustrating an apparatus for generating a panorama image in accordance with an embodiment of the present disclosure.

FIG. 1 is a block diagram illustrating an apparatus for generating a panorama image in accordance with an embodiment of the present disclosure.

Referring to FIG. 1, the apparatus 100 may include a Region Of Interest (ROI) selecting block 110, a High Dynamic Range (HDR) processing block 120, and a panorama image generating block 130. The ROI selecting block 110, the HDR processing block 120, and the panorama image generating block 130 may include at least one of a circuit, a system, software, firmware and a device necessary for their respective operations and functions.

The ROI selecting block 110 receives a plurality of images from the outside, selects an ROI of each of the plurality of received images, and outputs an ROI image. For example, the ROI selecting block 110 receives a first image img1, selects an ROI in the first image img1, and outputs an image corresponding to the selected ROI as a first ROI image ROI1. Also, the ROI selecting block 100 receives a second image img2, selects an ROI in the second image img2, and outputs an image corresponding to the selected ROI as a second ROI image ROI2. The ROI selecting block 110 selects image portions overlapping with each other in the first image img1 and the second image img2 respectively as ROIs of the first image img1 and the second image img2, and outputs the selected ROIs as the first ROI image ROI1 and the second ROI image ROI2.

The HDR processing block 120 receives the first ROI image ROI1 and the second ROI image ROI2 from the ROI selecting block 110, and generates a first HDR image H_ROI1 and a second HDR image H_ROI2 by performing HDR processing on each of the first ROI image ROI1 and the second ROI image ROI2

In order to provide various luminances in an image more similar to the capacity of eyes of a person, the HDR processing is used to increase a contrast ratio (difference between the brightest portion and the darkest portion) of an image or picture by expanding the range of brightness from the brightest spot to the darkest spot of the image or picture. The HDR processing means a technique for allowing a bright spot to be brighter and allowing a dark spot to be darker in an image or picture.

Also, the HDR processing block 120 receives a panorama image Panorama_img from the panorama image generating block 130, and performs the HDR processing on the received panorama image Panorama_img. The HDR processing block 120 outputs the panorama image F_Panorama_img, on which the HDR processing is performed.

The panorama image generating block 130 receives the first HDR image H_ROI1 and the second HDR image H_ROI2 from the HDR processing block 120, searches for a matching coordinate for stitching the first image img1 and the second image img2, based on the received first HDR image H_ROI1 and the received second HDR image H_ROI2, and generates the panorama image Panorama_img by stitching the first image img1 and the second image img2, using the searched matching coordinate. The stitching the first image img1 and the second image img2 may indicate that combining the first image img1 and the second image img2 with overlapping fields of view to produce a panorama image or a high-resolution image.

As described above, the apparatus 100 in accordance with the embodiment of the present disclosure can easily obtain a matching point for generating a panorama image by selecting regions in which a plurality of images overlap with each other as ROIs of the respective images, and performing first HDR processing on the selected ROIs of the images, so that a matching success rate can be improved. Further, after a panorama image is generated by stitching a plurality of images, second HDR processing is performed on the generated panorama image, so that the brightness difference between matched portions can be minimized.

Figure 2:
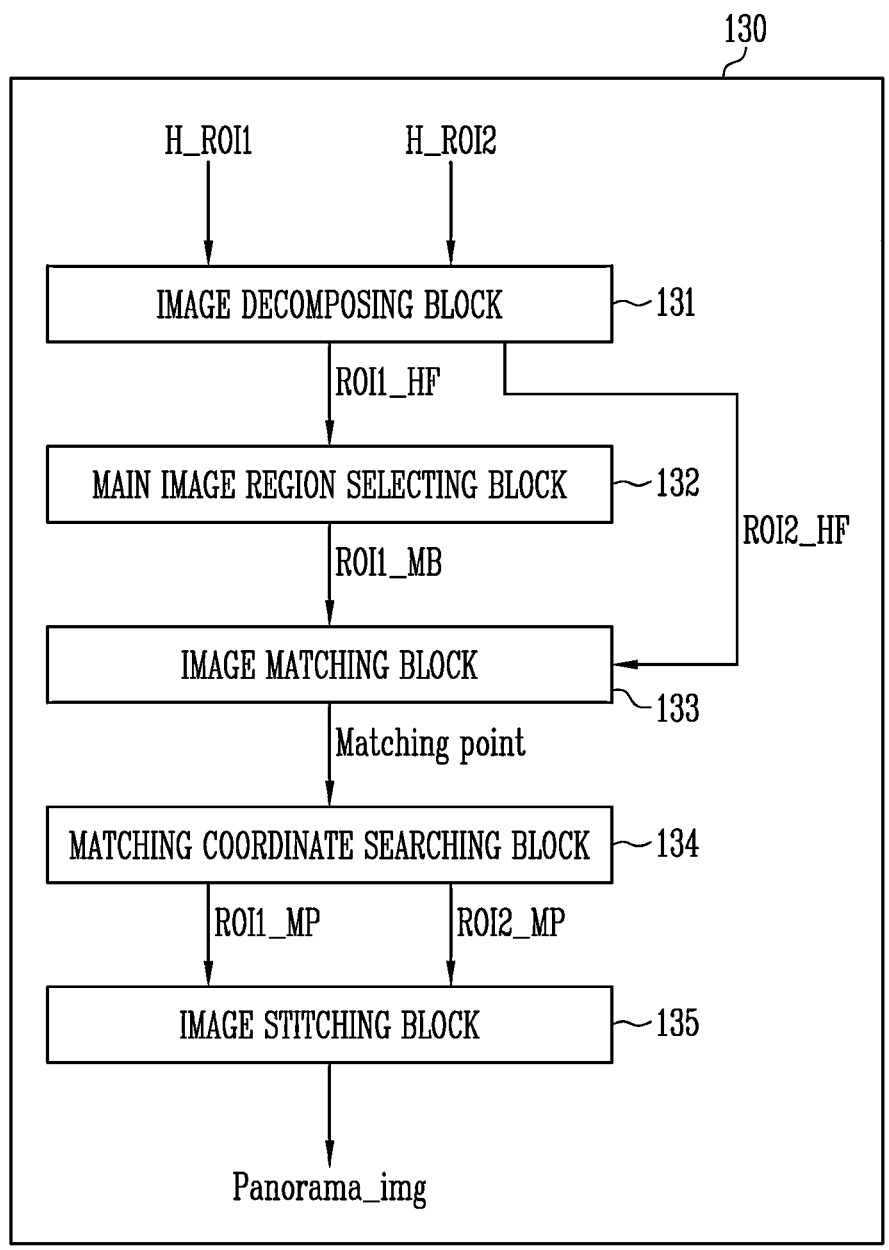
FIG. 2 is a block diagram illustrating a panorama image generating block shown in FIG. 1 in accordance with an embodiment of the present disclosure.

FIG. 2 is a block diagram illustrating the panorama image generating block 130 shown in FIG. 1 in accordance with an embodiment of the present disclosure.

Referring to FIG. 2, the panorama image generating block 130 may include an image decomposing block 131, a main image region selecting block 132, an image matching block 133, a matching coordinate searching block 134, and an image stitching block 135. The image decomposing block 131, the main image region selecting block 132, the image matching block 133, the matching coordinate searching block 134, and the image stitching block 135 may include at least one of a circuit, a system, software, firmware and a device necessary for their respective operations and functions.

The image decomposing block 131 receives the first HDR image H_ROI1 and the second HDR image H_ROI2 from the HDR processing block 120 shown in FIG. 1, and decomposes each of the received first HDR image H_ROI1 and the received second HDR image H_ROI2 into a low frequency image and a high frequency image. For example, the image decomposing block 131 may generate a first high frequency image ROI1_HF by extracting an image of a high frequency domain higher than a reference frequency from the first HDR image H_ROI1, and generate a second high frequency image ROI2_HF by extracting an image of a high frequency domain higher than the reference frequency from the second HDR image H_ROI2. For example, the image decomposing block 131 may generate the first high frequency image ROI1_HF by performing High Pass Filter (HPF) processing on the first HDR image H_ROI1, and generate the second high frequency image ROI2_HF by performing the HPF processing on the second HDR image H_ROI2.

The main image region selecting block 132 receives the first high frequency image ROI1_HF from the image decomposing block 131, divides the first high frequency image ROI1_HF into a plurality of image regions, and then selects, as a main image region, one image region in which the largest amount of detailed image information is included among the plurality of image regions. For example, the main image selecting block 132 may divide the first high frequency image ROI1_HF into a plurality of image regions having the same size, and select, as the main image region, one image region in which the largest amount of detailed image information is included among the plurality of image regions. An amount of detailed image information of each image region may be obtained by using a method such as standard deviation (STD), mean of absolute difference (MAD), or sum of absolute difference (SAD). The selected main image region of the first high frequency image ROI1_HF may be output as a main image ROI1_MB. The main image region selecting block 132 outputs the selected main image region of the first high frequency image ROI1_HF as a main image ROI1_MB.

The image matching block 133 selects a matching point by matching the main image ROI1_MB of the first high frequency image ROI1_HF, which is received from the main image region selecting block 132, to the second high frequency image ROI2_HF received from the image decomposing block 131. For example, the image matching block 133 selects the matching point by matching the main image ROI1_MB to the second high frequency image ROI2_HF, using a template matching technique.

The matching coordinate searching block 134 searches for each of a matching coordinate ROI1_MP of the first ROI image ROI1 and a matching coordinate ROI2_MP of the second ROI image ROI2, based on the matching point selected by the image matching block 133.

The image stitching block 135 generates the panorama image Panorama_img by stitching the first image img1 and the second image img2, using the matching coordinate ROI1_MP of the first ROI image ROI1 and the matching coordinate ROI2_MP of the second ROI image ROI2. For example, the image stitching block 135 may perform a blending process of combining data of the first image img1 and the second image img2 as an overlapping image by forming a linear combination of image data. The blending process is used to change a space between images stitched as one single image to become gentler such that a user can match the images. That is, the blending process may be a technique used to eliminate a sense of difference appearing in a boundary or a seam of an overlapping area when two images are combined to overlap each other.

Figure 3:
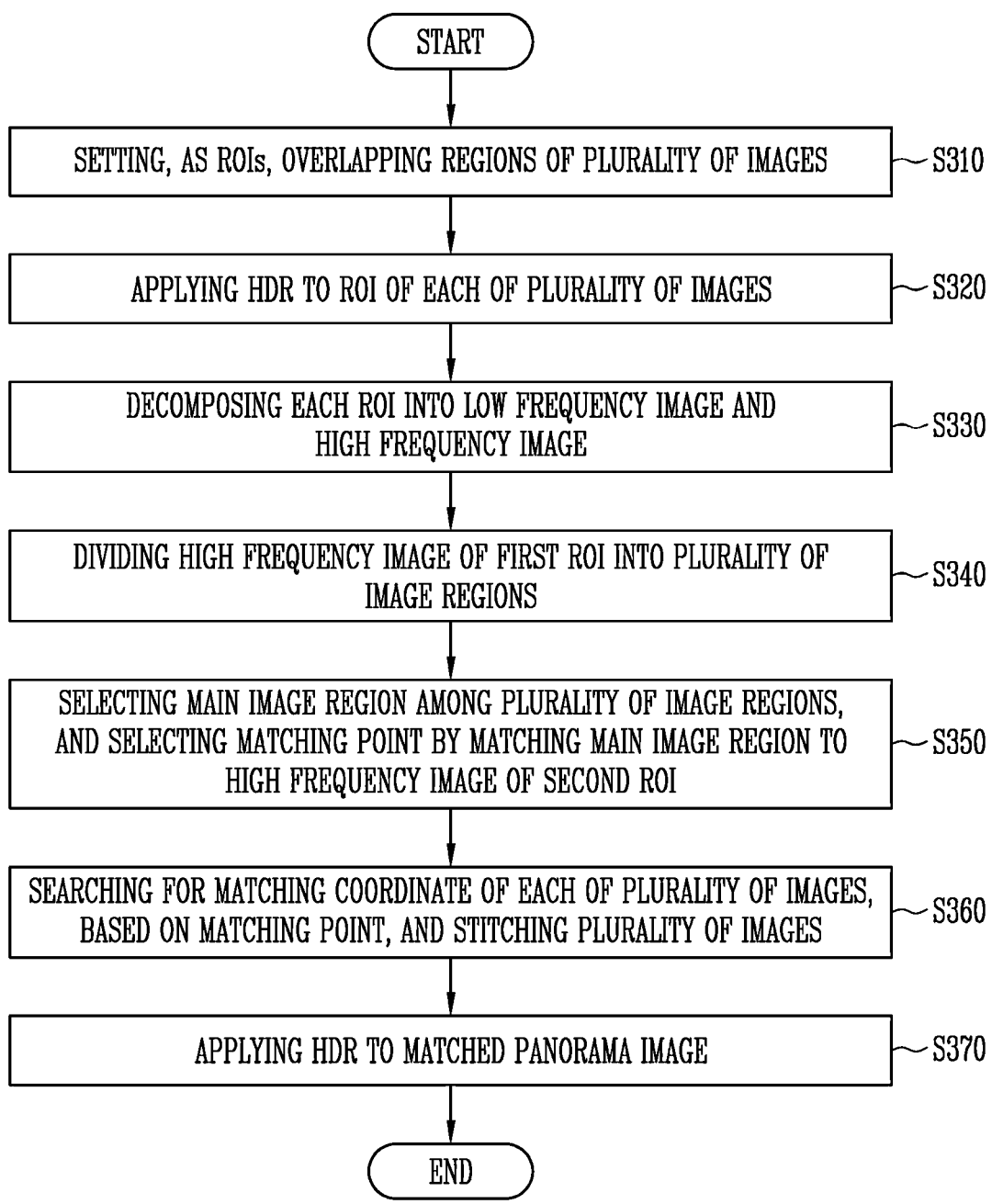
FIG. 3 is a flowchart illustrating a method for generating a panorama image in accordance with an embodiment of the present disclosure.

FIG. 3 is a flowchart illustrating a method for generating a panorama image in accordance with an embodiment of the present disclosure.

Figure 4:
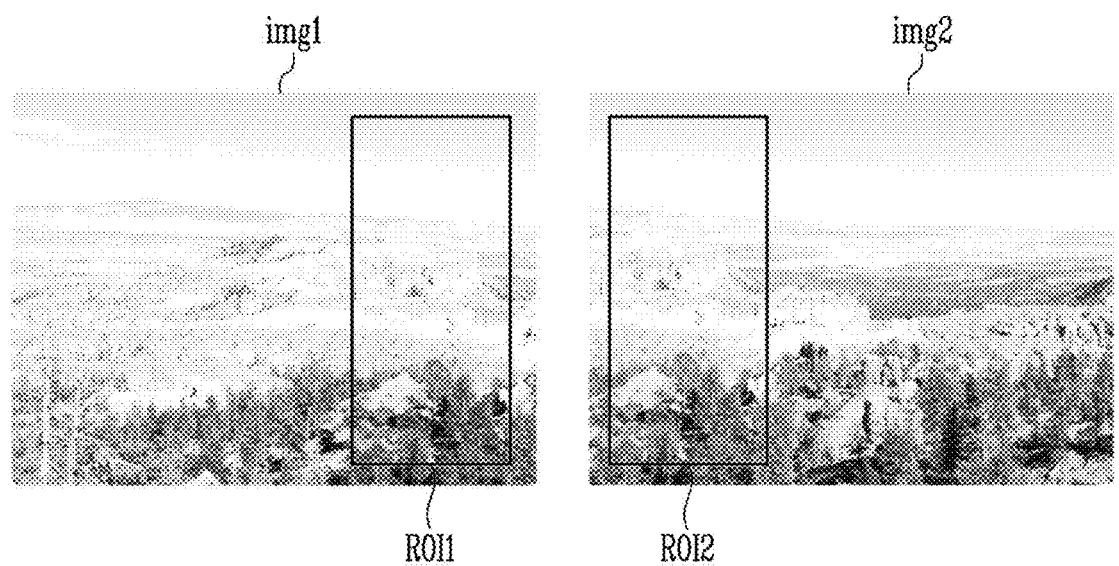
FIG. 4 is a diagram illustrating operation S310 shown in FIG. 3 in accordance with an embodiment of the present disclosure.

FIG. 4 is a diagram illustrating operation S310 shown in FIG. 3 in accordance with an embodiment of the present disclosure.

Figure 5:
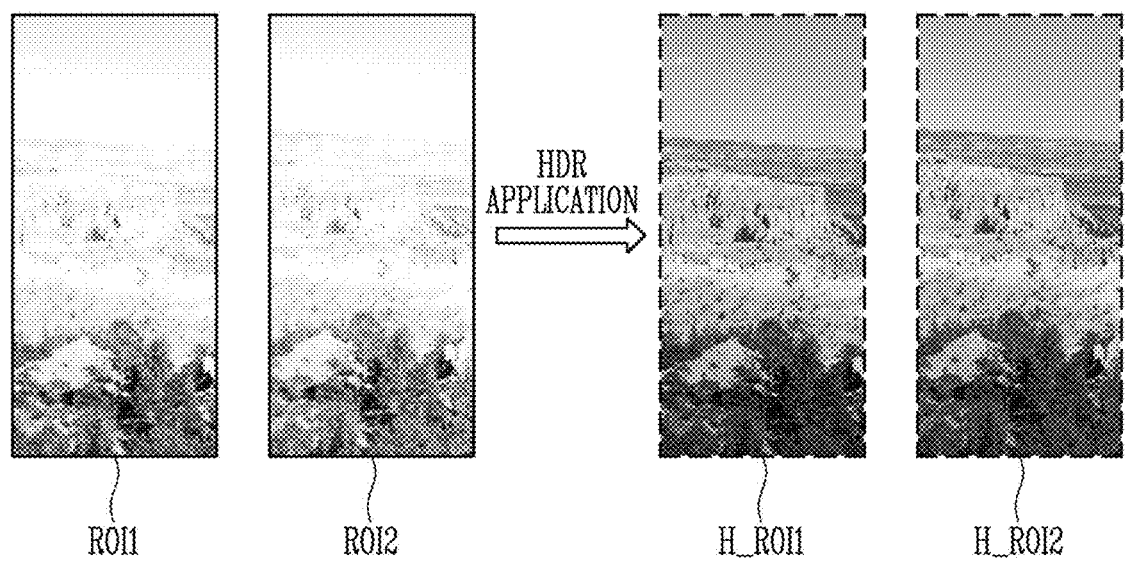
FIG. 5 is a diagram illustrating operation S320 shown in FIG. 3 in accordance with an embodiment of the present disclosure.

FIG. 5 is a diagram illustrating operation S320 shown in FIG. 3 in accordance with an embodiment of the present disclosure.

Figure 6:
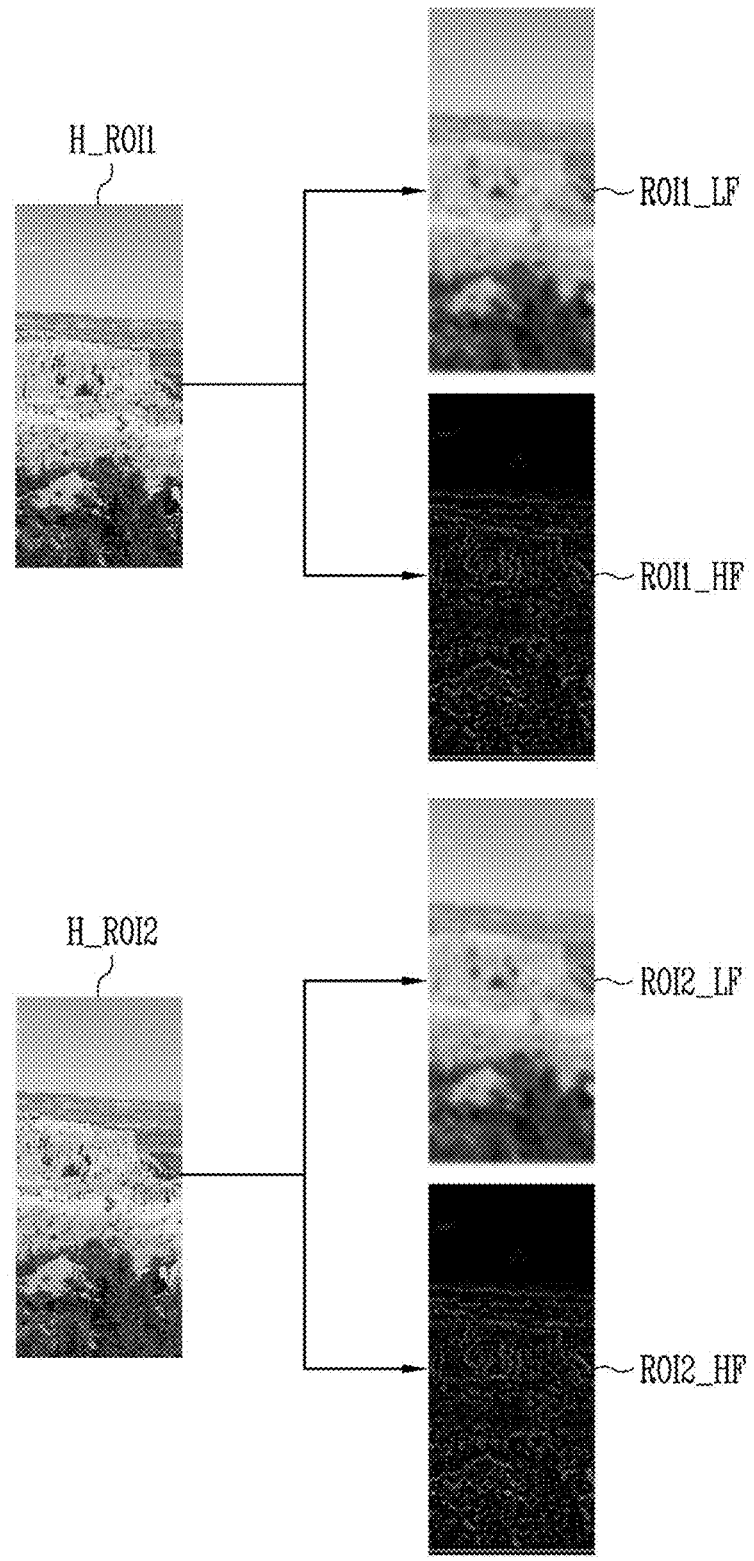
FIG. 6 is a diagram illustrating operation S330 shown in FIG. 3 in accordance with an embodiment of the present disclosure.

FIG. 6 is a diagram illustrating operation S330 shown in FIG. 3 in accordance with an embodiment of the present disclosure.

Figure 7:
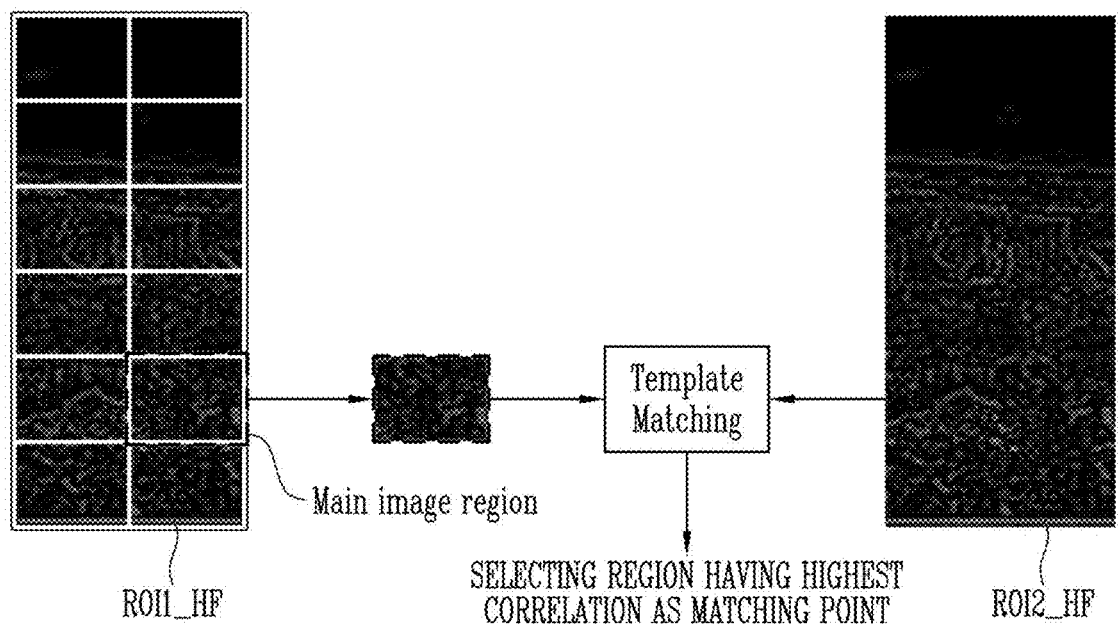
FIG. 7 is a diagram illustrating operations S340 and S350 shown in FIG. 3 in accordance with an embodiment of the present disclosure.

FIG. 7 is a diagram illustrating operations S340 and S350 shown in FIG. 3 in accordance with an embodiment of the present disclosure.

Figure 8:
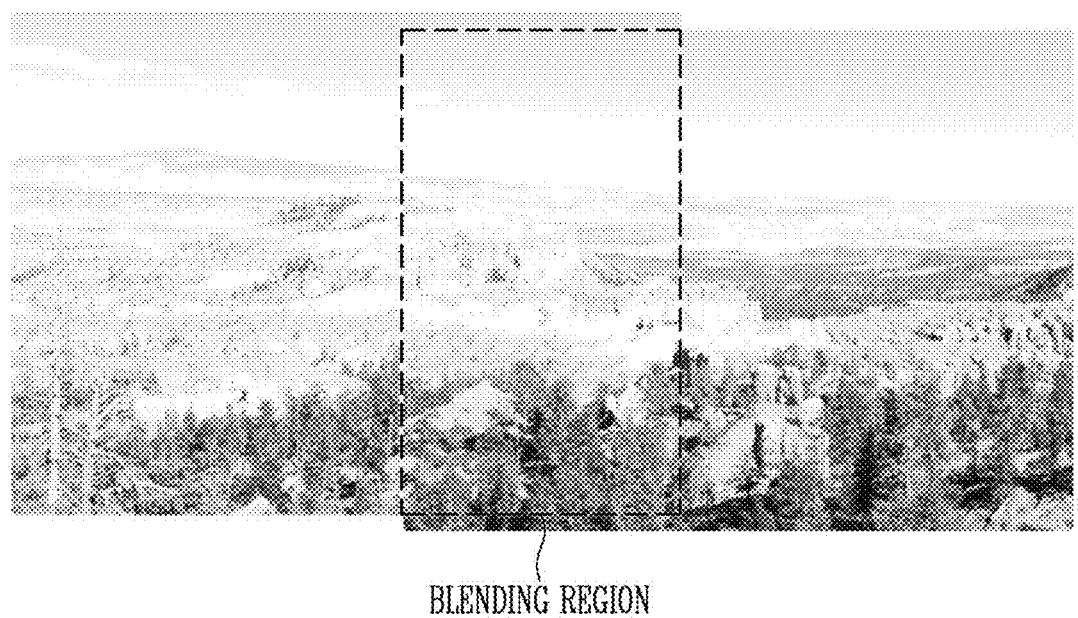
FIG. 8 is a diagram illustrating operation S360 shown in FIG. 3 in accordance with an embodiment of the present disclosure.

FIG. 8 is a diagram illustrating operation S360 shown in FIG. 3 in accordance with an embodiment of the present disclosure.

Figure 9:
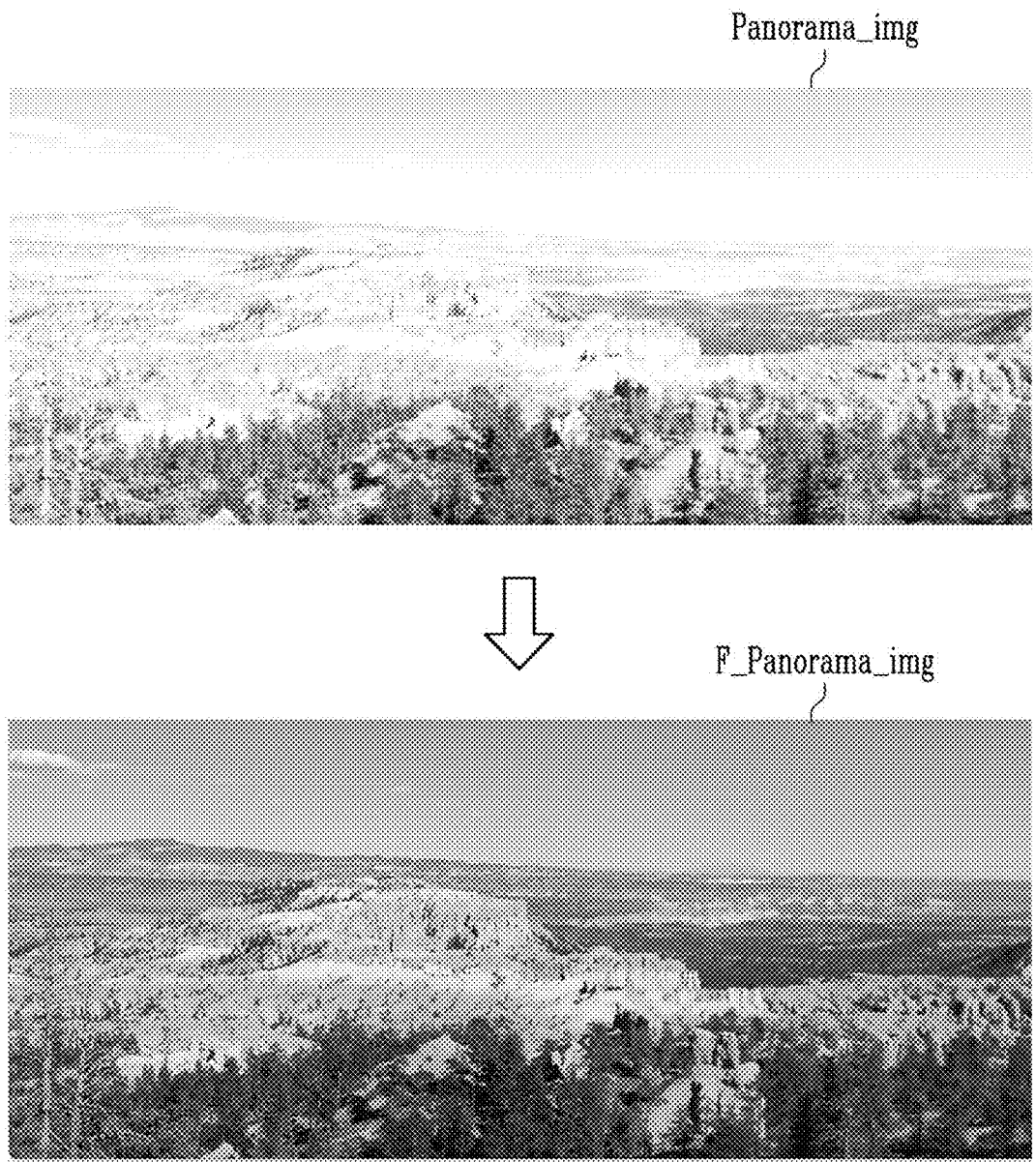
FIG. 9 is a diagram illustrating operation S370 shown in FIG. 3 in accordance with an embodiment of the present disclosure.

FIG. 9 is a diagram illustrating operation S370 shown in FIG. 3 in accordance with an embodiment of the present disclosure.

The method in accordance with the embodiment of the present disclosure will be described as follows with reference to FIGS. 1 to 9.

In the embodiment of the present disclosure, a method for generating one panorama image by matching a first image img1 and a second image img2 will be described.

In operation S310, an overlapping region of each of a plurality of images is selected as an ROI. For example, the ROI selecting block 110 receives a first image img1 and a second image img2 from the outside, selects image portions overlapping with each other in the first image img1 and the second image img2 respectively as ROIs of the first image img1 and the second image img2, and outputs the selected ROIs as a first ROI image ROI1 and a second ROI image ROI2.

In operation S320, HDR is applied to an ROI of each of the plurality of images. For example, the HDR processing block 120 receives the first ROI image ROI1 and the second ROI image ROI2 from the ROI selecting block 110, and generates a first HDR image H_ROI1 and a second HDR image H_ROI2 by performing HDR processing on each of the first ROI image ROI1 and the second ROI image ROI2. The HDR processing block 120 may perform the HDR processing on each of the first ROI image ROI1 and the second ROI image ROI2 by using a tone mapping technique. Since the HDR processing on the first ROI image ROI1 and the second ROI image ROI2 is used for matching, a tone mapping curve (TMC) which means a curve changing a luminance of a plurality of pixels may be artificially set. Also, the HDR processing block 120 may perform the HDR processing on the first ROI image ROI1 and the second ROI image ROI2 by using a contrast limited adaptive histogram equalization (CLAHE) method which is a brightness enhancement technique of a multi-layer based local region.

In operation S330, each ROI image is decomposed into a low frequency image and a high frequency image. For example, the image decomposing block 131 receives a first HDR image H_ROI1 and a second HDR image H_ROI2 from the HDR processing block 120, and decomposes each of the received first HDR image H_ROI1 and the received second HDR image H_ROI2 into a low frequency image and a high frequency image. For example, the image decomposing block 131 may generate a first high frequency image ROI1_HF by extracting an image of a high frequency domain higher than a reference frequency from the first HDR image H_ROI1, and generate a second high frequency image ROI2_HF by extracting an image of a high frequency domain higher than the reference frequency from the second HDR image H_ROI2. For example, the image decomposing block 131 may generate the first high frequency image ROI1_HF by processing High Pass Filter (HPF) processing on the first HDR image H_ROI1, and generate the second high frequency image ROI2_HF by performing the HPF processing on the second HDR image H_ROI2.

In operation S340, the high frequency image of the first HDR image H_ROI1 is divided into a plurality of image regions. For example, the main image region selecting block 132 receives the first high frequency image ROI1_HF from the image decomposing block 131, and divides the first high frequency image ROI1_HF into a plurality of image regions.

In operation S350, a main image region is selected among the plurality of image regions of the first high frequency image ROI1_HF, and a matching point is selected by matching the main image region to the high frequency image ROI2_HF of the second HDR image H_ROI2.

For example, the main image region selecting block 132 selects, as the main image region, one image region in which the largest amount of detailed image information is included among the plurality of image regions. For example, the main image selecting block 132 may divide the first high frequency image ROI1_HF into a plurality of image regions having the same size, and select, as the main image region, one image region in which the largest amount of detailed image information is included among the plurality of image regions. An amount of detailed image information of each image region may be obtained by using a method such as standard deviation (STD), mean of absolute difference (MAD), or sum of absolute difference (SAD). The selected main image region of the first high frequency image ROI1_HF may be output as a main image ROI1_MB.

The image matching block 133 selects a matching point by matching the main image ROI1_MB of the first high frequency image ROI1_HF, which is received from the main image region selecting block 132, to the second high frequency image ROI2_HF received from the image decomposing block 131. For example, the image matching block 133 selects the matching point by matching the main image ROI1_MB to the second high frequency image ROI2_HF, using a template matching technique. A region in which the correlation between the main image ROI1_MB and the second high frequency image ROI2_HF is highest in template matching may be selected as the matching point.

In operation S360, a matching coordinate of each of the plurality images is searched based on the matching point, and the plurality of images are stitched to generate a panorama image Panorama_img.

For example, the matching coordinate searching block 134 obtains a relative coordinate value of each image, based on the matching point selected by the image matching block 133, and accordingly, searches for each of a matching coordinate ROI1_MP of the first ROI image ROI1 and a matching coordinate ROI2_MP of the second ROI image.

The image stitching block 135 generates the panorama image Panorama_img by stitching the first image img1 and the second image img2, using the matching coordinate ROI1_MP of the first ROI image ROI1 and the matching coordinate ROI2_MP of the second ROI image ROI2. For example, the image stitching block 135 may perform a blending process of combining data of the first image img1 and the second image img2 as an overlapping image by forming a linear combination of image data.

In operation S370, the HDR is applied to the panorama image Panorama_img generated at operation S360. For example, HDR processing block 120 receives the panorama image Panorama_img from the panorama image generating block 130, and performs the HDR processing on the received panorama image Panorama_img. The HDR processing block 120 outputs the panorama image F_Panorama_img, on which the HDR processing is performed.

In accordance with embodiments of the present disclosure, a panorama image can be generated by using a plurality of images to which the HDR is applied, a matching success rate in a stitching operation of the plurality of images can be improved, and the brightness difference between portions overlapping with each other can be minimized.

In the above-described embodiments, all operations may be selectively performed or skipped. In addition, the operations in each embodiment may not always be sequentially performed in given order, and may be randomly performed. Furthermore, the embodiments disclosed in the present specification and the drawings aim to help those with ordinary knowledge in this art to more clearly understand the present disclosure rather than aiming to limit the bounds of the present disclosure. In other words, one of ordinary skill in the art to which the present disclosure belongs will be able to easily understand that various modifications are possible based on the technical scope of the present disclosure and the following claims. Furthermore, the embodiments may be combined to form additional embodiments.

What is claimed is:

1. An apparatus for generating a panorama image, the apparatus comprising:
    a Region Of Interest (ROI) selecting block configured to receive a plurality of images and configured to output ROI images by selecting an ROI of each of the plurality of images;
    a High Dynamic Range (HDR) processing block configured to perform HDR processing on the ROI images; and
    a panorama image generating block configured to:
    divide a high frequency image corresponding to one ROI image among the ROI images, on which the HDR processing is performed, into a plurality of image regions;
    select a main image region among the plurality of image regions;
    select a matching point of high frequency images corresponding to the ROI images by mapping the main image region to each of the high frequency images, wherein the matching point is a region having a highest correlation between the main image region and each of the high frequency images;
    search for a matching coordinate of the ROI images based on the matching point; and
    generate a panorama image by stitching the plurality of images based on the matching coordinate,
    wherein the HDR processing block is further configured to perform the HDR processing on the panorama image.

2. The apparatus of claim 1, wherein the ROI selecting block is configured to select, as the ROIs, image portions overlapping with each other among the plurality of images.

3. The apparatus of claim 1, wherein the HDR processing block is configured to perform the HDR processing on the ROI images by using a tone mapping technique or a contrast limited adaptive histogram equalization (CLAHE) method.

4. The apparatus of claim 1, wherein the panorama image generating block includes:
    an image decomposing block configured to obtain the high frequency images from the ROI images on which the HDR processing is performed;
    a main image region selecting block configured to divide the high frequency image from among the high frequency images, into the plurality of image regions, and configured to select one of the plurality of image regions as the main image region;
    an image matching block configured to select the matching point by matching the main image region to one of remaining high frequency images different from the high frequency image from among the high frequency images;
    a matching coordinate searching block configured to search for the matching coordinate of the ROI images, on which the HDR processing is performed, based on the matching point; and
    an image stitching block configured to generate the panorama image by stitching the plurality of images using the matching coordinate.

5. The apparatus of claim 4, wherein the image decomposing block is configured to obtain the high frequency images corresponding to the ROI images by extracting images of a high frequency domain higher than a reference frequency from the ROI images on which the HDR processing is performed.

6. The apparatus of claim 4,
wherein the plurality of image regions have the same size, and
wherein the main image region selecting block is configured to select, as the main image region, one image region, from among the plurality of image regions, in which the largest amount of detailed image information is included.

7. The apparatus of claim 6, wherein the main image region selecting block is further configured to obtain an amount of detailed image information of each of the plurality of image regions by using a scheme of standard deviation (STD), mean of absolute difference (MAD), or sum of absolute difference (SAD).

8. The apparatus of claim 4, wherein the image matching block is configured to match the main image region to the one of the remaining high frequency images, by using a template matching technique.

9. The apparatus of claim 4, wherein the image stitching block is configured to stitch the plurality of images by performing a blending process of combining data of the plurality of images as an overlapping image by forming a linear combination of image data.

\* \* \* \* \*